(12) United States Patent
Drummond et al.

(10) Patent No.: US 7,611,049 B2
(45) Date of Patent: *Nov. 3, 2009

(54) CHECK ACCEPTING CASH DISPENSING AUTOMATED BANKING MACHINE SYSTEM AND METHOD

(75) Inventors: Jay Paul Drummond, Massillon, OH (US); Mark D. Smith, North Canton, OH (US); Natarajan Ramachandran, Uniontown, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/290,886

(22) Filed: Nov. 3, 2008

(65) Prior Publication Data

US 2009/0134215 A1     May 28, 2009

Related U.S. Application Data

(60) Continuation of application No. 11/639,660, filed on Dec. 15, 2006, now Pat. No. 7,445,146, which is a continuation-in-part of application No. 10/892,257, filed on Jul. 14, 2004, now Pat. No. 7,150,393, which is a division of application No. 09/966,932, filed on Sep. 27, 2001, now Pat. No. 6,796,490, said application No. 11/639,660 is a continuation-in-part of application No. 09/776,503, filed on Feb. 2, 2001, now Pat. No. 7,483,859, and a continuation-in-part of application No. 11/415,531, filed on May 2, 2006, now Pat. No. 7,201,313, which is a continuation-in-part of application No. 10/795,926, filed on Mar. 8, 2004, now Pat. No. 7,040,533, which is a continuation-in-part of application No. 09/826,675, filed on Apr. 5, 2001, now Pat. No. 6,702,181, which is a division of application No. 09/076,051, filed on May 11, 1998, now Pat. No. 6,315,195, said application No. 11/639,660 is a continuation-in-part of application No. 09/505,594, filed on Feb. 16, 2000.

(60) Provisional application No. 60/082,299, filed on Apr. 17, 1998, provisional application No. 60/237,812, filed on Oct. 4, 2000, provisional application No. 60/180,490, filed on Feb. 5, 2000, provisional application No. 60/250,269, filed on Nov. 30, 2000, provisional application No. 60/133,579, filed on May 11, 1999, provisional application No. 60/120,506, filed on Feb. 17, 1999.

(51) Int. Cl.
*G06Q 40/00* (2006.01)
*G07D 11/00* (2006.01)
*G07F 19/00* (2006.01)

(52) U.S. Cl. .................. 235/379; 235/376; 235/472.01; 235/472.02; 705/43

(58) Field of Classification Search ................. 235/379, 235/382, 376, 380, 382.5, 472.01; 705/5, 705/30, 35, 42

See application file for complete search history.

(56) References Cited

U.S. PATENT DOCUMENTS 5,860,158 A     1/1999 Pai (Continued)

*Primary Examiner*—Edwyn Labaze
(74) *Attorney, Agent, or Firm*—Ralph E. Jocke; Daniel D. Wasil; Walker & Jocke

(57) ABSTRACT

A card activated cash dispensing automated banking machine system and method is provided. The machine is operate to read a financial card bearing account indicia with a card reader of the machine. The machine enables a user to perform banking operations responsive to account indicia read from the card. Such banking operations may include dispensing cash and accessing financial accounts. While a user operates the machine to dispense cash or perform other banking operations, the machine may further permit at least one portable wireless device to wirelessly access the machine to purchase and wirelessly receive digital information such as music and/or video files from the machine.

20 Claims, 8 Drawing Sheets

U.S. PATENT DOCUMENTS

| | | |
|---|---|---|
| 6,039,245 A | 3/2000 | Symonds |
| 6,271,752 B1 | 8/2001 | Vaios |
| 6,311,165 B1 | 10/2001 | Coutts |
| 6,415,341 B1 | 7/2002 | Fry |
| 6,793,134 B2 | 9/2004 | Clark |
| 2006/0074803 A1 * | 4/2006 | Crowell et al. ............... 705/40 |

* cited by examiner

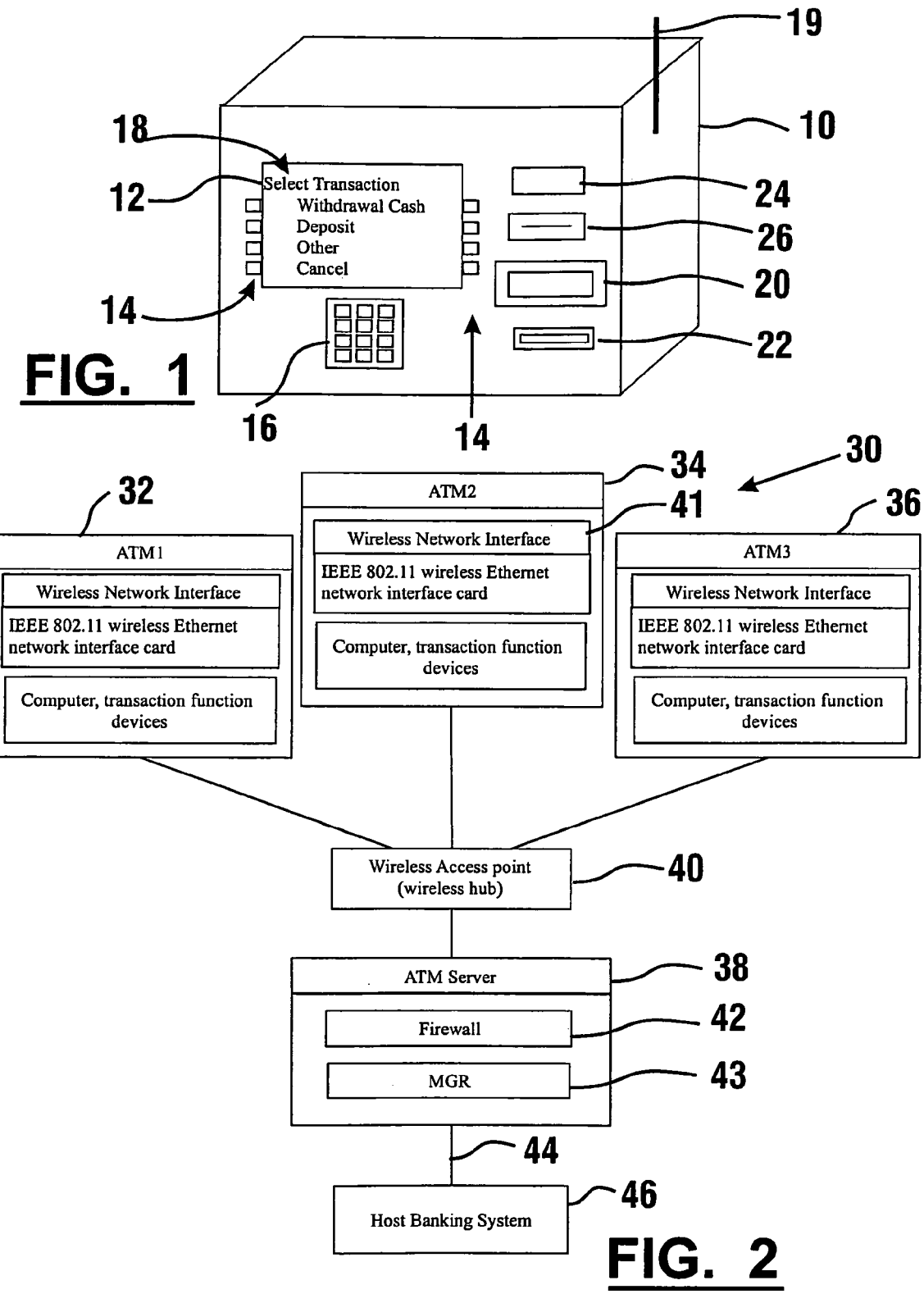

CHECK ACCEPTING CASH DISPENSING AUTOMATED BANKING MACHINE SYSTEM AND METHOD

CROSS REFERENCE TO RELATED APPLICATION

This application is a continuation of U.S. patent application Ser. No. 11/639,660 filed Dec. 15, 2006 (now U.S. Pat. No. 7,445,146), which is a continuation-in-part of copending application Ser. No. 10/892,257 filed on Jul. 14, 2004, which is a divisional of application Ser. No. 09/966,932 filed on Sep. 27, 2001, which claims benefit pursuant to 35 U.S.C. § 119 (e) of provisional application Ser. No. 60/237,812 filed Oct. 4, 2000, application Ser. No. 11/639,660 is also a continuation-in-part of co-pending application Ser. No. 09/776,503 filed Feb. 2, 2001, which claims benefit pursuant to 35 U.S.C. § 119(e) of provisional application Ser. Nos.: 60/180,490 filed Feb. 5, 2000 and 60/250,269 filed Nov. 30, 2000, application Ser. No. 10/892,257 is also a continuation-in-part of co-pending application Ser. No. 11/415,531 filed May 2, 2006, which is a continuation-in-part of U.S. application Ser. No. 10/795,926 filed on Mar. 8, 2004, which is a continuation-in-part of U.S. application Ser. No. 09/826,675 filed Apr. 5, 2001, which is a divisional of U.S. application Ser. No. 09/076,051 filed May 11, 1998, which claims benefit pursuant to 35 U.S.C. § 119 (e) of U.S. Provisional Application Ser. No. 60/082,299 filed Apr. 17, 1998, application Ser. No. 10/892, 257 is also a continuation-in-part of copending U.S. application Ser. No. 09/505,594 filed on Feb. 16, 2000, which claims benefit pursuant to 35 U.S.C. § 119(e) of U.S. provisional application Ser. Nos.: 60/133,579 filed May 11, 1999 and 60/120,506 filed Feb. 17, 1999. All of the above applications are hereby incorporated herein by reference.

TECHNICAL FIELD

An exemplary embodiment relates to card activated cash dispensing automated banking machines. Specifically at least one exemplary embodiment relates to an automated banking machine system and method that includes a card reader and a cash dispenser.

BACKGROUND ART

Automated banking machines are known. A type of automated banking machine used by consumers is an automated teller machine ("ATM"). Automated banking machines enable customers to carry out banking transactions. Banking transactions that may be carried out with automated banking machines may include the dispensing of cash, the receipt of deposits, the transfer of funds between accounts, the payment of bills, cashing checks, receiving money orders and account balance inquiries. The type of banking transactions a customer can carry out are often determined by the capabilities of the particular banking machine and the programming of the machine by the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or travelers checks. For purposes of this disclosure an ATM, automated banking machine or automated transaction machine shall encompass any device which carries out transactions including transfers of value.

OBJECTS OF EXEMPLARY EMBODIMENTS

It is an object of an exemplary embodiment to provide a card activated automated banking machine at which a user may conduct banking transactions.

It is a further object of an exemplary embodiment to provide a card activated automated banking machine which dispenses cash.

It is a further object of an exemplary embodiment is to provide methods for operation of a card activated cash dispensing automated banking machine system.

Further objects of other exemplary embodiments will be made apparent in the following Detailed Description of Exemplary Embodiments and the appended claims.

The foregoing objects are accomplished in an exemplary embodiment by an automated banking machine that includes output devices such as a display screen, speakers, and a receipt printer. The automated banking machine also includes input devices such as a card reader, touch screen, keypad and/or a function keys. The automated banking machine further includes transaction function devices such as a dispenser mechanism for sheets of currency, a printer mechanism, a depository mechanism and other transaction function devices that are used by the machine in carrying out banking transactions. In addition the automated banking machine may include communication devices, such as networking components which enable the machine to communicate with other machines and devices across a wired or wireless network.

The automated banking machine is in operative connection with at least one computer. The computer is in operative connection with the output devices, the input devices, the communication devices, and the transaction function devices in the machine. The computer is operative to execute a plurality of software applications stored in a local data store such as a hard drive, flash memory, or other application storage medium. Such software applications may include an operating system. Such software applications may also include automated banking machine software that is operative to provide the computer with the programming necessary to cause the machine to carry out a plurality of different banking functions and other operations as described below in more detail.

The exemplary embodiment of the machine further includes a wireless network interface. The wireless network interface is operative to provide the machine with wireless access to at least one public, private, and/or proprietary network. In one exemplary embodiment the wireless network interface includes a digital cellular receiver and transmitter in operative connection with the computer. The computer is operative to use the wireless network interface to call out over a digital cellular communication network to form a secure connection with a remote host banking system. Transaction messages may then be communicated between the machine and the host banking system through wireless digital cellular calls.

In an alternative exemplary embodiment the wireless network interface includes a wireless ethernet network interface card in operative connection with the computer. The computer is operative to wirelessly connect to a wireless ethernet hub (also referred to herein as a wireless access point) located within range of the machine. The exemplary wireless ethernet hub is in operative connection with one or more public or private wide area networks that include one or more host banking systems.

In exemplary embodiments, the automated banking machine may be operative to authorize and perform transactions with the host banking system by sending and receiving communications across a wireless connection. The wireless connection enables the exemplary machine to be placed in locations which do not have physical access to a land line based communication network connection or port. For example it may be desirable to place an automated banking machine in a location such as the middle of a room or hallway. Such locations are typically very difficult to wire with a communication port because there is often no adjacent wall or poll to route a network or phone line. Alternative exemplary embodiments may include automated banking machines located on portable structures or on vehicles.

In a further exemplary embodiment an automated banking machine may be adapted to provide portable wireless devices with access to a public or private wide area network in operative connection with the machine. In such embodiments, an exemplary wireless network interface of the machine may include a wireless hub, router or gateway device that is selectively operative to give portable wireless devices fee based access to a wide area network such as the Internet. Examples of portable wireless devices include notebook computers, cell phones, PDAs, Palm® compatible devices or any other portable or handheld computing device that has wireless functionality.

When the wireless device initially connects to the machine, information corresponding to an account associated with the portable wireless device may be communicated to the machine. The automated banking machine responsive to the account information may verify that the account is valid by further communicating with a host banking system or other authorization server. Once authorization is verified the machine may give the portable wireless device access to the wide area network In exemplary embodiments the automated banking machine may accept information corresponding to an account such as a credit card or debit card account. Such an exemplary machine may provide access to the wide area network for a fee which is charged to the credit or debit card. Alternatively charges may be made to data representative of monetary value on a smart card or stored in a memory in or operatively connected to the portable device. Such a fee for example may be based on the amount of time the user spends connected to the wide area network, the amount of data being communicated, or a flat fee rate for unlimited access for a certain time period. Exemplary embodiments may accept other forms of payment such as electronic money transferred from the device. Also the machine may accept payment by direct transfer of money from an authorized checking account, savings account or other financial account associated with the portable wireless device to an account associated with the machine. In one or more of the previously described embodiments, the machine may further require the user to enter an identification value, a password or a personal identification number (PIN) that is associated with the user or their account.

In some exemplary embodiments the machine may accept an Internet Service Provider (ISP) account and a password associated with the account. The machine may access an ISP that is associated with the account to determine if the remote device is permitted access. The machine may then report the amount of usage to the ISP and the service provider may bill the owner of the device for the cost of the network usage.

In a further exemplary embodiment, an automated banking machine may enable a portable wireless device to conduct transactions with the automated banking machine. Such transactions may include for example the dispense of cash, a balance inquiry, the transfer of funds between accounts, the payment of bills, the deposit of checks, cash, or transfer of electronic money to or from an account, the purchase of tickets, or any other transaction that includes the transfer of value.

For transactions such as the withdrawal of physical cash, exemplary embodiments of an automated banking machine may enable multiple portable wireless devices to perform the majority of the transaction steps at a distance from the machine and then individually prompt each user of a device to come into proximity with the machine and receive the corresponding cash withdrawal. To limit the potential for cash to be dispensed to the incorrect user, the machine may further require the portable wireless device to send a "dispense now" or other message when the user is standing next to the cash dispenser device portion of the machine or is otherwise in position to receive the requested cash.

In an exemplary embodiment, the automated banking machine may enable a plurality of users to wirelessly access the machine at the same time and/or during overlapping time period using portable devices. Through such wireless access, the machine may wirelessly enable a plurality of portable devices to simultaneously search and purchase digital content previously stored on the machine. Digital content purchased through operation of the machine may be wirelessly transmitted from the automated machine to the respective portable wireless device which issued the commands to purchase the digital content. Examples of digital content available for being wirelessly purchased and received through operation of the automated banking machine include media files comprising movies, videos, TV shows, music videos, music, or any other digital content that can be packaged and sold through operation of an automated banking machine.

To reduce the possibility that wireless information may be intercepted by third parties, exemplary automated banking machines may be operative to perform a secure handshaking protocol with each portable wireless device. Such a protocol is operative to establish an encrypted communication channel for passing information between the banking machine and each portable wireless device. Such a protocol may be based on a Secure Sockets Layer (SSL) protocol for example which includes the authentication of digital certificates. Each automated banking machine, or a grouping of associated banking machines, may have their own digital certificates which can be independently authenticated by the portable wireless devices. Such digital certificates can provide the users of the portable wireless devices with assurances that the automated banking machine they are communicating with is a legitimate machine and not an imposter device posing as an automated banking machine for purposes of stealing account number information and identification values.

In exemplary embodiments the automated banking machine may be made in a smaller form factor by eliminating input and/or output devices such as the display screen, keypads, and function keys found in conventional ATMs for example. For such embodiments, the portable wireless devices may include a client software application which provides a user interface on the display device of the portable wireless device for interfacing and performing transactions with the automated banking machine. For example, such a client application may be a downloaded plugin for a browser of the portable wireless device or may be a Java® application operative in a Java Virtual Machine of the portable wireless device. Such a client may be based on HTML, WML or XML based documents received from the machine. In other embodiments the client may be a service that is integrated into the operating system or hardware of the portable wireless device.

The exemplary client may further include a data store which is operative to store a log of transactions performed with the client. The client may further be operative to export the log of transactions to a financial software application such as Quickens or Microsoft Moneys. In other exemplary embodiments the automated banking machine may further be operative to communicate with portable wireless terminals of maintenance users. Such portable wireless devices may include client applications which are operative to facilitate the servicing of the machine remotely.

BRIEF DESCRIPTION OF DRAWINGS

FIG. 1 is a perspective view of an exemplary wireless ATM apparatus used in an exemplary system.

FIG. 2 is a schematic view representative of an exemplary wireless ATM system.

DETAILED DESCRIPTION OF EXEMPLARY EMBODIMENTS

Figure 3:
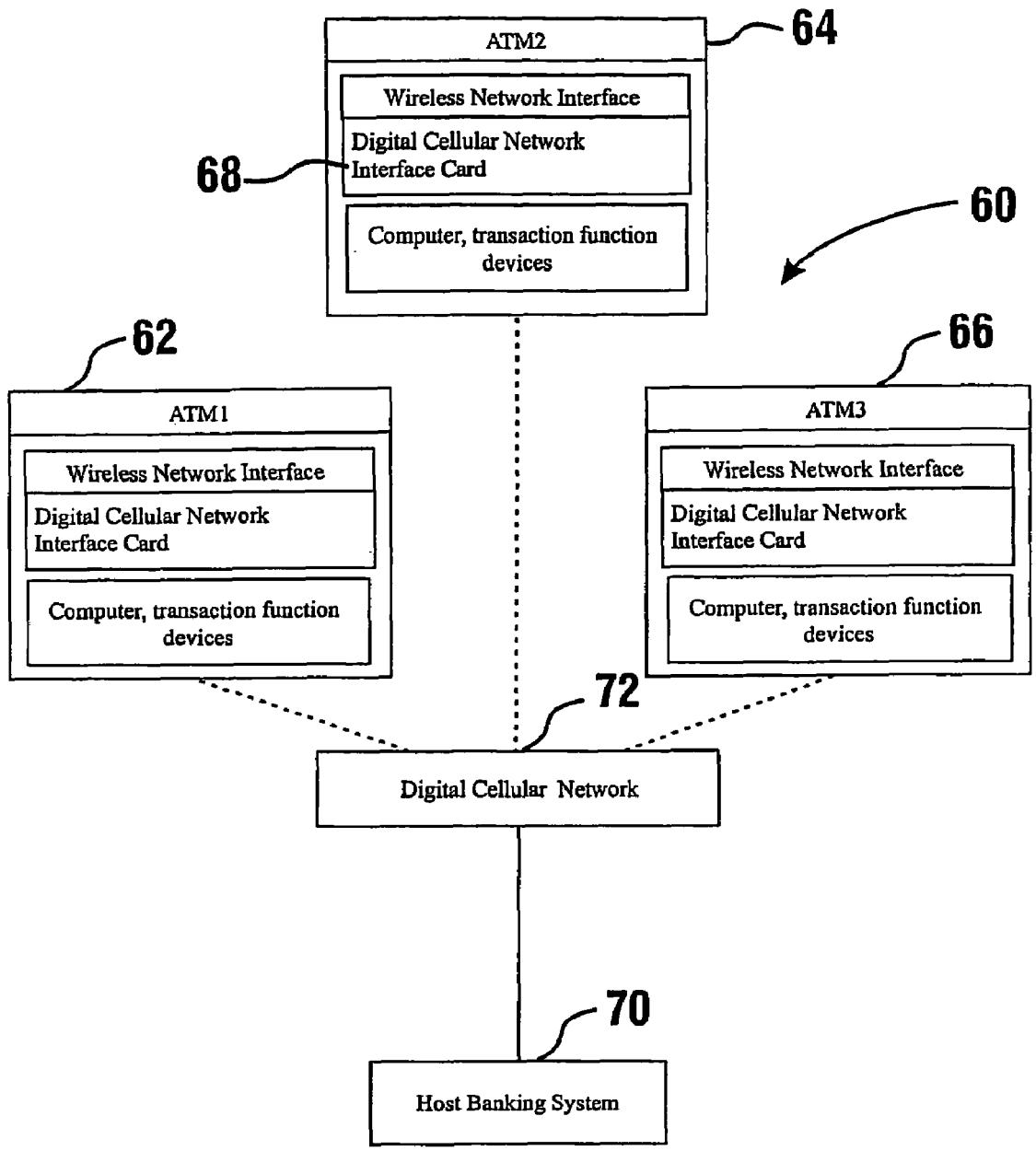
FIG. 3 is a schematic view representative of an alternative exemplary wireless ATM system.

Referring now to the drawings and particularly to FIG. 1, there is shown therein a perspective view of an automated banking machine or ATM 10 of one exemplary embodiment of the present invention. The exemplary automated banking machine 10 includes at least one output device such as a display device 12. The output device 12 is operative to provide a consumer with a user interface 18 that includes a plurality of selectable options for operating the machine. The exemplary embodiment may further include other types of output devices such as speakers, or any other type of device that is capable of outputting visual, audible, or other sensory perceptible information.

The exemplary automated transaction machine 10 includes a plurality of input devices such as function keys 14 and a keypad 16. The exemplary embodiment may further include other types of input devices such as microphones or any other device that is operative to provide the machine with inputs representative of consumer communication. The automated banking machine 10 further includes a plurality of transaction fiction devices such as a sheet or cash dispenser 20, depositor 22, receipt printer 24, and card reader 26. The exemplary automated transaction machine 10 further includes a wireless network interface 19 that is operative to transmit and receive wireless information.

FIG. 2 is representative of an exemplary wireless ATM system 30. The wireless ATM system 30 includes a plurality of wireless ATMs 32, 34, 36. Each of the wireless ATMs is operative to wirelessly communicate with a wireless ATM server 38. In the described exemplary embodiment the wireless ATMs include a wireless network interface 41 such as an IEEE 802.11a, 802.11b, 802.11g, and/or 802.11n wireless network interface card. The wireless ATM server 40 is in operative connection with a wireless access device such as a wireless access point or wireless hub 40 which is operative to communicate with each of the wireless network interfaces of the wireless ATMs 32, 34, 36. The exemplary wireless ATMs and ATM server provide data security for wireless communications using a wireless encryption protocol such as Wired Equivalent Privacy (WEP), Wireless Access Protocol (WAP) and/or other wireless compatible cryptographic authentication and communication protocol.

The exemplary wireless ATM server 38 is operative to communicate with at least one remote host banking system 46 through at least one public or private network 44. The wireless ATM server 38 is operative to route transaction and event messages between the host banking system 46 and each of the ATMs 32, 34, 36. In one exemplary embodiment the wireless ATM server 38 includes a Message Gateway Router 43 (MGR) or other functionally comparable apparatus which is operative to receive, transform and forward messages between a plurality of ATMs and host banking systems. An example of an MGR is disclosed in U.S. Pat. No. 6,039,245 which is incorporated herein by reference in its entirety. In addition the exemplary wireless ATM server 38 further includes a firewall 42. The firewall 42 is operative to prevent unauthorized communications with the wireless ATMs 32, 34, 36. The firewall is further operative to prevent unauthorized communication with the system 30 from a rogue wireless device within range of the wireless access point 40. The firewall is also operative to prevent unauthorized access to the system from external devices communicating through the network 44.

FIG. 3 is representative of an alternative wireless ATM system 60. Here each of the ATMs 62, 64, 66 includes a wireless network interface device 68 such as a digital cellular or mobile phone based network interface card which is operative to communicate with a digital cellular network 72. In this described exemplary system 60 the host banking system 70 is accessed by the ATMs through the digital cellular network 72, rather than calling a host banking system through a land line based network or telephone connection. Examples of cellular networks that may be used include digital cellular based networks such as GSM CDMA, CDPD, or TDMA. Exemplary embodiments may also use the WAP when making calls to the host banking system through a digital cellular network. Communication between the ATM and the host banking system may also be encrypted using an encryption protocol such as Wireless Transport Level Security (WTLS) and Secure Sockets Layer (SSL).

Figure 4:
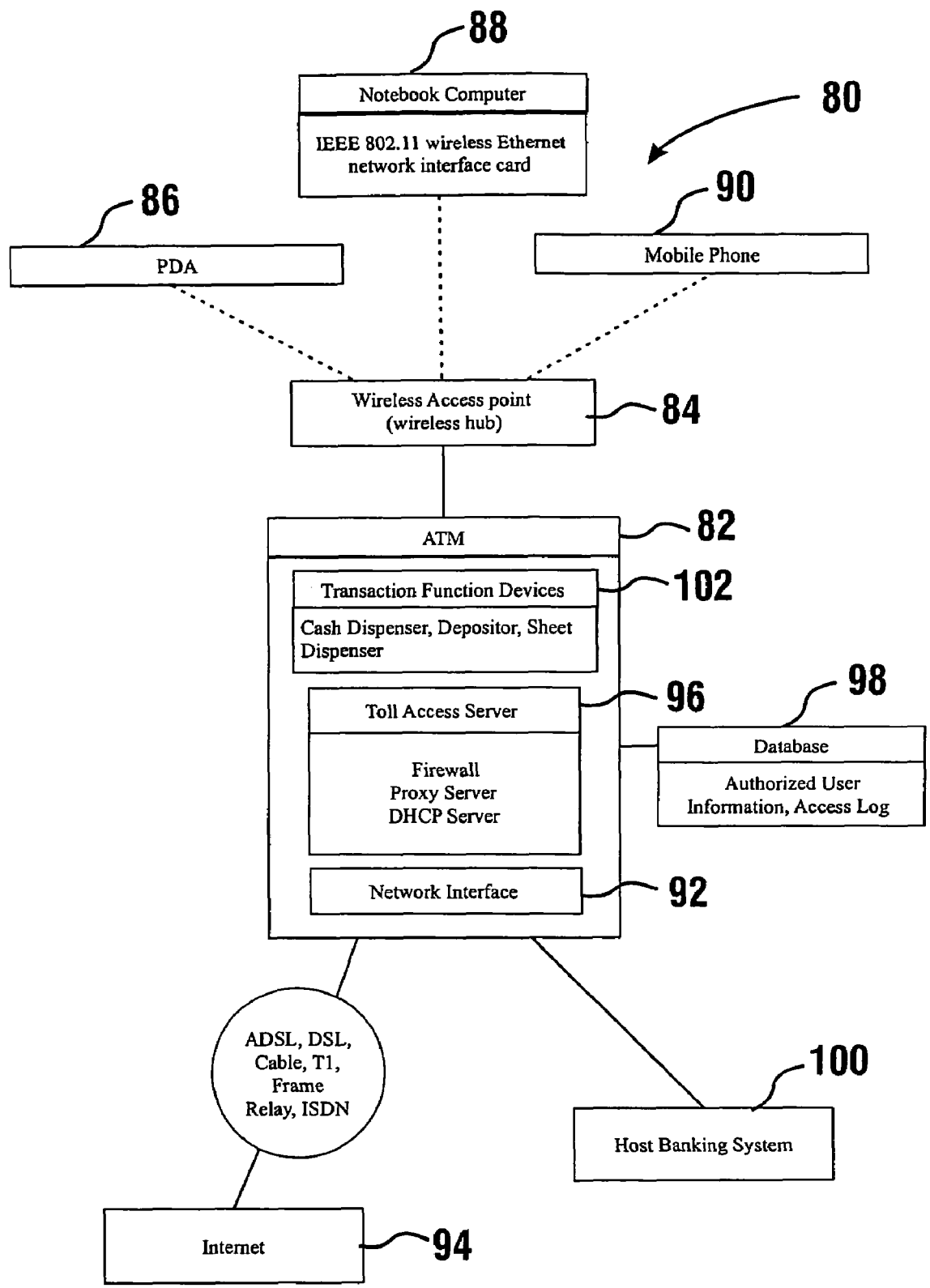
FIG. 4 is a schematic view representative of a further alternative exemplary wireless ATM system.

FIG. 4 is representative of an alternative wireless ATM system 80. Here the system includes an Internet Service Provider (ISP) ATM 82. The exemplary ISP ATM 82 includes transaction function devices 102 such as a cash dispenser, depositor, sheet dispenser, and card reader. In addition the exemplary ISP ATM 82 is in operative connection with and/or may include therein a wireless access device such as a wireless access point or wireless hub 84. The wireless access point is operative to enable the ISP ATM 82 to wirelessly communicate with a plurality of portable wireless devices within range of the wireless access point 84. Examples of portable wireless devices include notebook computers 86, personal digital assistants (PDAs) and mobile phones 90 or other devices which are capable of providing voice communication and/or data communication. In the exemplary embodiment the portable wireless devices include an IEEE 802.11a,b,g and/or n compatible network interface which is operative to communicate with the wireless access point 84 of the ISP ATM 82. However, alternative exemplary embodiments of the system 80 may use any other wireless network interfaces and systems between the portable wireless devices and the ATM, including for example generally short range RF communication such as Bluetooth™ and IR based systems. Exemplary embodiments may also use a transport protocol such as WAP.

The exemplary ISP ATM 82 further includes an external network interface 92 that is operative to connect the ISP ATM 82 with a public wide area network such as the Internet 94. In one exemplary embodiment the external network interface 92 includes a high speed network connection such as ISDN, ADSL, DSL, Cable Modem, T1, Fractional T1, or Frame Relay. The network interface (92) may also be a wireless interface may as discussed previously. In this described embodiment of the exemplary system 80, the ISP ATM 82 is operative to provide the portable wireless devices 86, 88, and 90 with access to the Internet 94. The exemplary ISP ATM 82 is operative to provide such access for a fee which may be charged to an account associated with a portable wireless device.

The exemplary ISP ATM 82 includes a toll access server software component 96 which is operative to individually provide portable wireless devices with access to the Internet. When a portable wireless device logs onto the ISP ATM 82 for the first time, the toll access server 96 is operative to receive identifying information from the portable wireless device. In one exemplary embodiment the identifying information may include a user ID and password. In other embodiments other identifying values or combinations of values may be used, for example biometric inputs, digital certificates or other indicia usable to identify a user and/or a portable wireless device.

The exemplary toll access server is operative to validate the identifying information by comparison of the user ID and password to a local or remote database 98 of authorized users. Once access is provided, the toll access server is further operative to store a log of parameter information such as the source of data, amount of time and/or amount of transferred data that is used by the portable wireless device. Such a log may be used to calculate a fee for the Internet access which is billed to the user of the portable wireless device.

In an exemplary embodiment, the toll access server may accept identifying information from a portable wireless device which is in the form of a financial account such as a credit, debit, checking or savings account. If the account is associated with a password such as a Personal Identification Number (PIN), the toll access server may further require the portable wireless device to provide a PIN along with the account information. The exemplary ISP ATM 82 is operative to charge an access fee directly to the provided account. Such a fee may be based on the amount of time or data usage of the user. The fee may also be based on a one time access fee for unlimited usage for a certain period of time. The exemplary toll access server 96 is further operative to have the ISP ATM 82 authorize and charge the account through communication with a host banking system 100. In alternative embodiments the portable wireless device or a smart card or other memory device associated therewith may include data representative of monetary value, which may be modified through communication with the ATM to pay charges associated with network usage and/or transactions carried out with the ATM such as dispensing cash.

In one exemplary embodiment of the present invention, an exemplary ISP ATM 82 may be located in a publicly accessible location. Such locations may for example include airport terminals, libraries, restaurants, shopping malls, or any other private or public area with a population of users that requires both access to the Internet and access to transaction functions such as cash dispensing.

Figure 5:
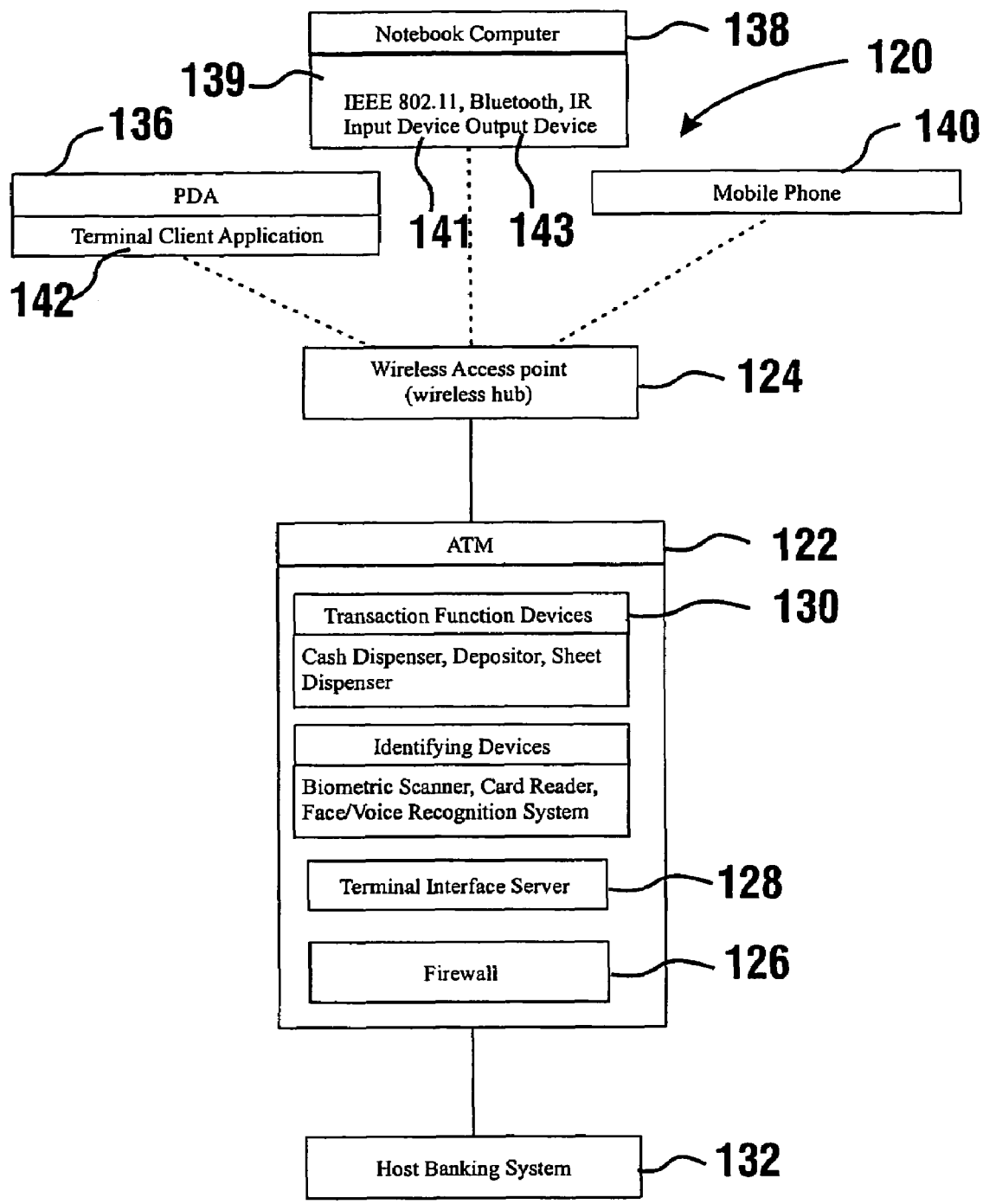
FIG. 5 is a schematic view representative of a further alternative exemplary wireless ATM system.

FIG. 5 is representative of a further exemplary wireless ATM system 120. Here the system 120 includes a wireless enabled ATM 122. The exemplary ATM 122 is in operative connection with a wireless access point or wireless hub 124. A plurality of portable wireless devices 136, 138 and 140 are operative to wirelessly communicate with the wireless access point 124 of the ATM 122. The wireless communication may be based on any wireless system 139 that is operative to securely transport information between the portable wireless devices and the ATM, including IEEE 802.11, Bluetooth™ or any other RF or IR based wireless system. The described exemplary embodiment may also use a transport protocol such as WAP. The ATM 122 further includes a firewall 126 that is operative to reduce the risk of unauthorized communications passing between the portable wireless devices 136, 138, 140 or other devices and the ATM 122.

In addition the exemplary ATM 122 further includes a terminal interface server application 128. The exemplary terminal interface server 128 is operative to provide each of the plurality of portable wireless devices with an individual interface to the ATM 128 for performing transactions. In one exemplary embodiment the exemplary terminal interface server 128 is operative to output HTML, WML, XML or other mark up language based documents for each portable wireless device. Portable wireless devices with an HTML, WML or XML based browser are operative responsive to receipt of the documents to display a plurality of interface screens. The exemplary interface screens include a plurality of selectable options that are representative of transaction functions that may be performed with the ATM 122.

The exemplary terminal interface server is operative to provide each portable wireless device with its own individual and separate access session. As a result each portable wireless device may simultaneously perform transactions with the ATM 122. For example a first portable wireless device 128 may initiate a balance inquiry with the ATM 122 while a second portable wireless device 126 is operative to initiate a transfer of funds between two accounts using the ATM 122. The exemplary terminal interface server 128 is operative to separately maintain a plurality of individual sets of transaction states for each portable wireless device session.

In further exemplary embodiments the portable wireless devices may include a terminal client application 142 that is specifically programmed to log onto the ATM 122 and provide the portable wireless device with an interface for performing transactions with the ATM 122. In an exemplary embodiment the terminal client application 142 may be a hardware independent program such as a Java® applet that is operative to run in a Java Virtual Machine® of the portable wireless device 136. In another exemplary embodiment the terminal client application may be a hardware specific application which is targeted to the specific operating system and/or hardware platform of the portable wireless device 136.

In an exemplary embodiment the exemplary terminal client application is required to be installed on the portable wireless devices prior to enabling the terminal client to initially log onto the ATM 122. However, in an alternative exemplary embodiment the portable wireless devices may be operative to perform a handshaking protocol with the ATM 122 when initially logging onto the ATM. Such a handshaking protocol may provide the portable wireless devices with the initial information and/or terminal client application software which is necessary to perform transactions with the ATM 122. Examples of handshaking protocols which may be used to connect portable wireless devices to an ATM are shown in U.S. patent application Ser. No. 09/505,594 which is owned by the assignee of the present invention incorporated herein by reference in its entirety.

The described exemplary system 120 is further operative to enable two or more portable wireless devices to initiate transactions which require use of the same physical transaction function devices 130 of the ATM. For example, two portable wireless devices may initiate the withdrawal of cash from the ATM 122 at about the same time. When this occurs, the exemplary terminal interface server is operative to contemporaneously authorize each separate withdrawal transaction through communication with a host banking system 132. However because it may be undesirable to dispense both sets of withdrawals in one group or stack of currency sheets, the exemplary terminal interface server is operative to sequentially prompt each user to step forward before dispensing a withdrawal of currency to a user.

When a prompted user is adjacent the cash dispenser of the ATM 122, the user may then select an option such as by providing one or more inputs through one or more input devices 141 on his/her portable wireless device which causes the ATM 122 to dispense the cash. Alternatively, the user may be prompted to provide one or more inputs or one or more identification values through one or more input devices on the ATM so as to cause the cash to be dispensed. This described exemplary procedure for prompting a user to sequentially move adjacent to the banking machine may also be applied to other transaction function devices of the ATM 122 such as a check depository, sheet dispenser, or any other physical transaction device which may be needed by multiple users. The ATM may also operate in such circumstances to capture data from a user or an associated article for purposes of verifying or documenting the transaction. For example the ATM may capture biometric data such as a face scan or an iris scan to verify the identity of the person conducting the transaction. The ATM may also capture features of deposited currency, checks or other instruments for correlating information concerning users and deposited items.

In addition to enabling multiple users to wirelessly perform transactions with the ATM 122, the exemplary ATM 122 may further be operative to enable a portable wireless device of a servicer of the ATM to wirelessly perform maintenance operations on the ATM 122. The exemplary terminal interface server 128 may be operative to provide a portable wireless device of a servicer with a set of HTML, WML or XML or other mark up language based documents which provide selectable options for checking error logs, troubleshooting, and performing service or maintenance related tasks with the ATM 122. In alternative exemplary embodiments of the system 120 the portable wireless device of a servicer may include a dedicated service client application which is operative to wirelessly perform maintenance tasks with the ATM 122.

Figure 6:
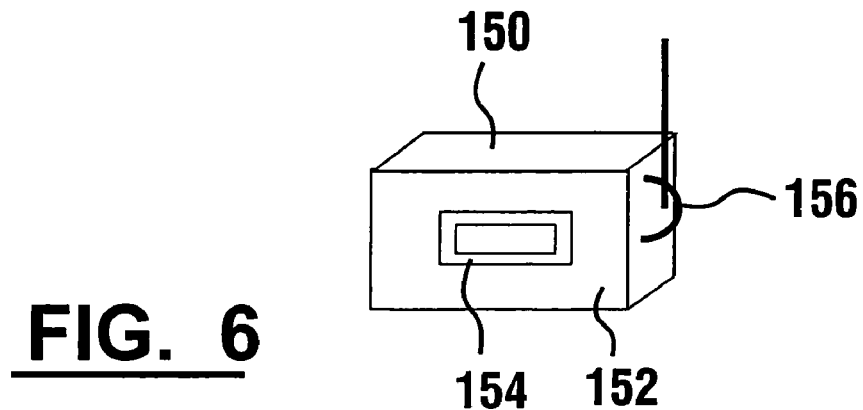
FIG. 6 is a perspective view of an alternative exemplary ATM apparatus.

In the described exemplary embodiment of the wireless system 120, the interactive interface for operating the ATM 122 is created on the portable wireless devices 136, 138, and 140. As a result, exemplary forms of the ATM 122 may be produced in a smaller form factor which does not include one or more of a display monitor, keypad, and/or function keys. An example of such a displayless and keypadless ATM is shown in FIG. 6. Here the ATM 150 includes a publicly accessible fascia 152, and which ATM includes one or more transaction function devices such as a cash dispenser 154. The exemplary ATM 150 further includes a wireless access point 156 which may enable a plurality of portable wireless devices to access the ATM simultaneously. The exemplary fascia 152 of the ATM 150, however, does not include a large display device such as a CRT or LCD based monitor. As a result the ATM 150 may be placed in smaller spaces with limited room for an ATM opening. In addition the ATM 150 may be manufactured at a lower cost due to the elimination of parts associated with the display, keypad, and/or function keys.

Figure 7:
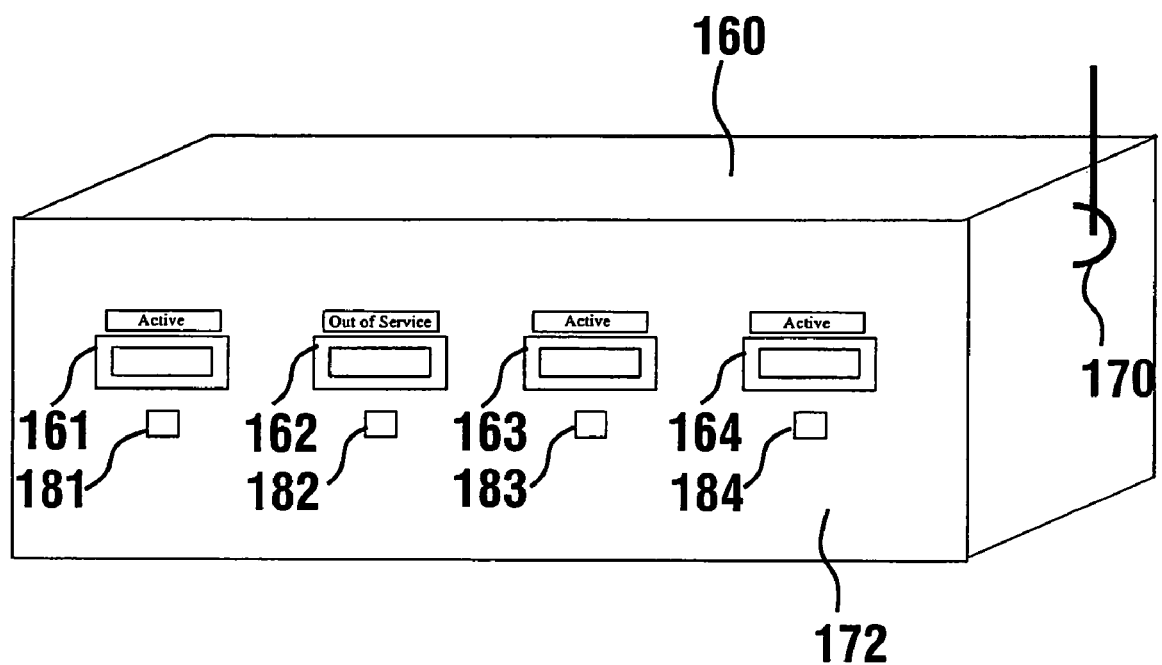
FIG. 7 is a perspective view of a further alternative exemplary ATM apparatus.

FIG. 7 shows an alternative exemplary embodiment of an ATM 160 that includes a plurality of transaction functions devices of the same type. Here the exemplary ATM 160 includes a plurality of cash dispenser outlets 161-164. It should be understood that in some embodiments that ATM may comprise multiple complete cash dispenser mechanisms and in others a single cash dispenser mechanism may deliver bills to transaction function devices such as presenters that deliver bills from the ATM through an outlet. The exemplary ATM 160 includes a wireless access point 170 which may be operative to enable a plurality of portable wireless devices to access the ATM 170 simultaneously. Each of the cash dispenser outlets is spaced apart along the fascia 172 of the ATM 160 such that different individual users may be able to stand adjacent different cash dispenser outlets simultaneously.

The exemplary ATM 160 further includes a plurality of identifying devices 181-184 which are each in association with a transaction function device 161-164. Such identifying devices are operative to receive one or more identification values that can be used to determine an identity of the user and/or the user's portable wireless device or other article that is adjacent a cash dispenser outlet or other transaction function device. By correlating the determined identity of the adjacent user and/or the user's portable device or other article to the portable device performing a transaction, the exemplary ATM 160 is operative to have each transaction function device perform the proper transaction fiction for the corresponding adjacent user.

In one exemplary embodiment the identifying devices 181-184 may include a biometric reader device such as a fingerprint scanner. When a wireless transaction has been authorized, the exemplary ATM 160 may be operative to communicate one or more messages to cause the portable wireless device to prompt the user to step adjacent any available transaction function device 161-164 and press a corresponding fingerprint scanner surface. The exemplary ATM 160 includes a computer that is operative to scan the fingerprint and correlate the fingerprint scan to the transaction. This may be done by correlating the one or more identifying values associated with the fingerprint scan to values in a data store. This may be for example a remote data store which includes data which enables correlation of identification values with particular users, accounts or other identifying data. Alternatively, a data store included in the portable wireless device or on another item associated with a user or their account such as a smart card, may include one or more identification values which can be used to verify that the identification data from the fingerprint scan corresponds to the authorized user of the portable wireless device, smart card or other item. Once a fingerprint scan has been correlated to a transaction, the ATM 160 is operative to operate the transaction fiction device that is adjacent the user to complete the transaction. In alternative embodiments other types of biometric devices may be used, for example a face or voice recognition system, or an iris or retina scan device. In addition alternative exemplary embodiments may use other forms of identifying devices or identifying values or combinations thereof such as a bar code scanner, card reader, IR-sensor, digital certificate, password, PIN or any other device or method which is operative to provide identifying information from a user or an object in the user's possession which can be used to determine that a transaction or user is authorized.

In alternative embodiments the automated banking machine may establish wireless communication with the portable device. The user through the portable device may communicate one or more wireless messages with the banking machine indicating the type and amount of one or more transactions the user wishes to conduct. The banking machine may then communicate with a remote host system to determine if the requested transaction is authorized. The banking machine may then advise the user through a wireless message to the portable device from the banking machine that the transaction is authorized and can be conducted when the user wishes for the transaction to proceed. The user may be notified of the status through output devices 143 on the portable device. The user then may provide one or more further inputs so as to commit to the transaction, which causes a message from the portable device to the banking machine. Such commitment messages may be generated when the user is adjacent to the banking machine and may cause the machine to carry out the requested transaction function in response thereto. Alternatively, the user may commit to the transaction and thereafter be required to provide one or more inputs to either the portable device and/or input devices on the banking machine to carry out the transaction function and complete the transaction. Such approaches may provide greater assurance that the authorized user is in position to receive cash from the machine (or otherwise receive from or provide to the machine transaction items associated with the transaction). This enables users to minimize the time spent at the banking machine. Of course such approaches are exemplary and in other embodiments other approaches may be used.

In an exemplary embodiment, an automated banking machine may further be operative to enable a plurality of portable wireless devices to wirelessly communicate with the machine to search and purchase digital information or content previously stored on the ATM. The purchased digital information may then be communicated wirelessly from the ATM to the one or more wireless devices. In an exemplary embodiment digital information may be purchased and communicated to one or more portable wireless devices through operation of the ATM while a user is operating the machine to carry out a banking function such as dispensing cash.

Figure 8:
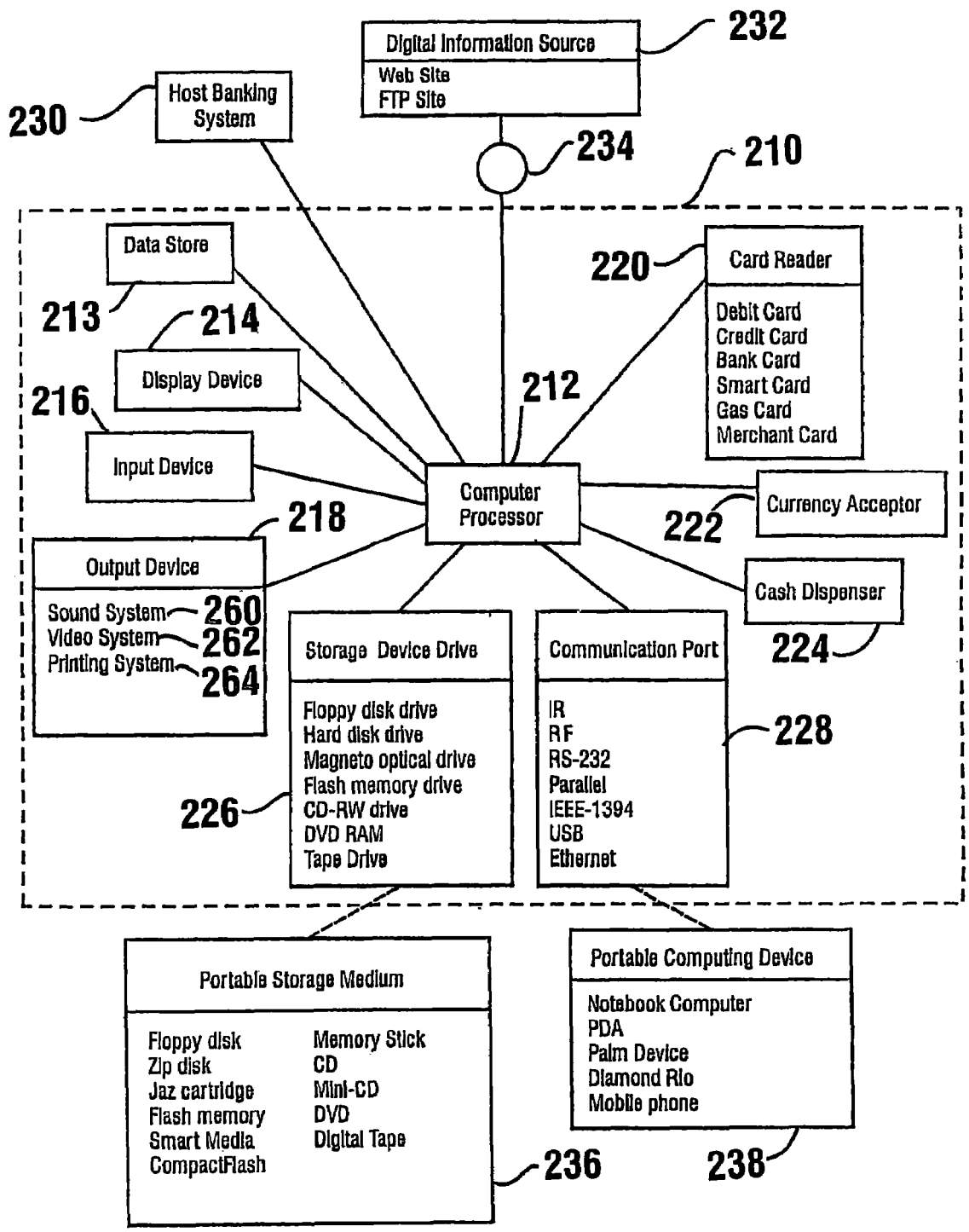
FIG. 8 is a schematic view representative of an exemplary embodiment of an automated banking machine and system that is operative to wirelessly dispense digital information to portable wireless devices.

An example of an automated banking machine such as an ATM 210 that is operative to dispense digital information to portable wireless devices and other devices is shown in FIG. 8. Here the ATM 210 includes at least one computer processor 212 that is operatively programmed to enable the ATM to perform at least one banking transaction such as the dispense of cash. The computer processor 212 is also operatively programmed to enable the ATM to dispense digital content which is alternatively referred to herein as digital information. To perform these functions the ATM further includes in operative connection with the computer processor 212, at least one data store 213, a display device 214, at least one input device 216, at least one output device 218, a card reader 220 which also serves as an input device, and a cash dispenser 224. The ATM 210 is further operative to communicate with at least one financial transaction processing computer which is operative to carry out financial transfers which in this example is host banking system 230. ATM 210 also is enabled to communicate with at least one digital information source 232. In the exemplary embodiment of the present invention the ATM 210 is operative to download digital information from the digital information source 232 through a network 34 such as the Internet.

It should be understood that the ATM 210 and system are exemplary and in other embodiments automated transaction machines may include other or additional devices and may operate in other types of systems. For example, embodiments of the present invention may include in operative connection with the computer processor 212, a currency acceptor 222, a data store including a storage device drive 226, and a communication port 228 which serves as an output device. The storage device drive 226 serves as a local data store and enables the computer processor to dispense digital information to a portable storage medium 236. The communication port 228 enables the computer processor to cause the dispense of digital information to a portable computing device 238.

Figure 9:
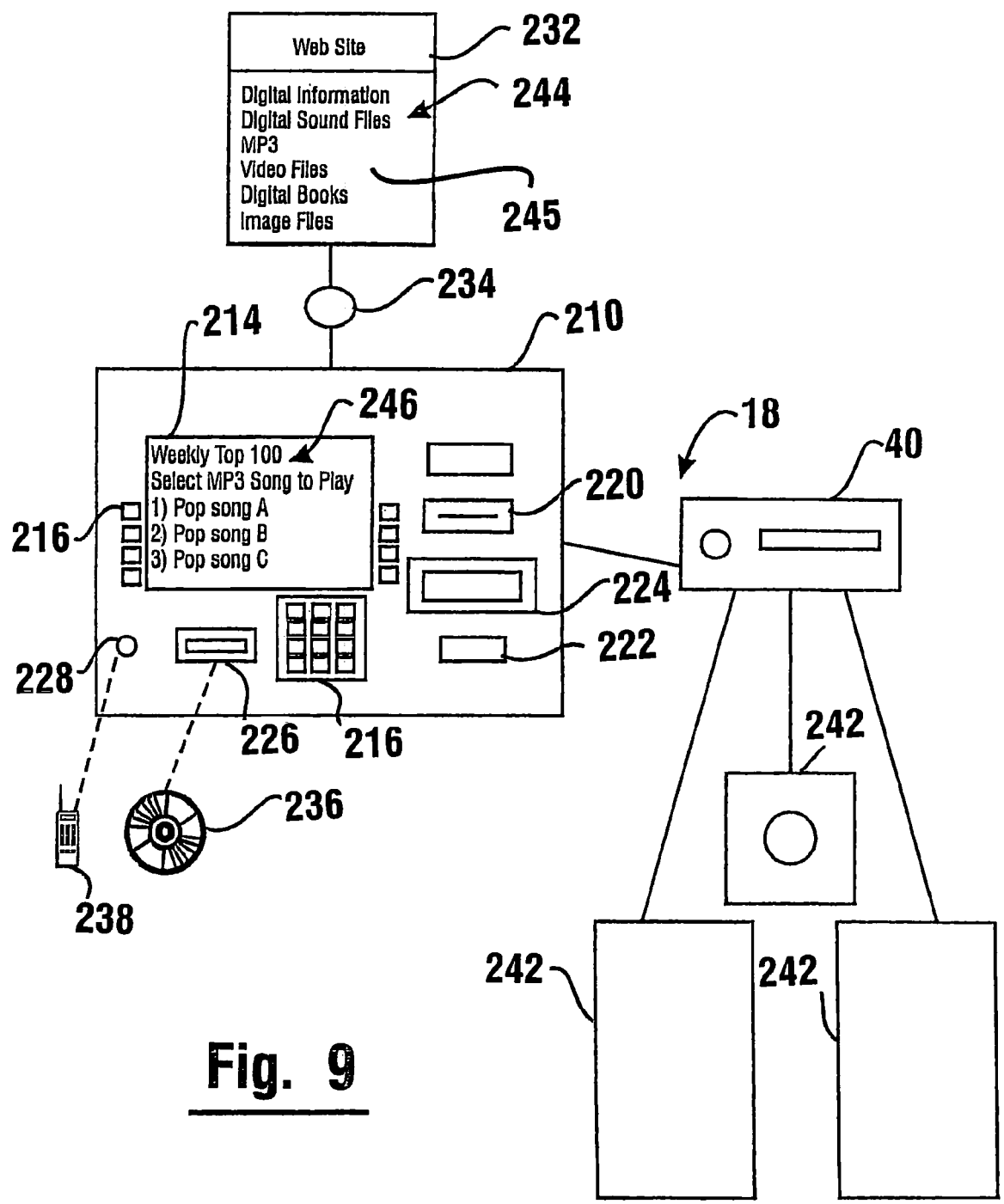
FIG. 9 is a schematic view representative of an exemplary embodiment of an automated transaction machine and system that is operative to dispense digital sound recordings.

FIG. 9 schematically shows an exemplary embodiment of the ATM 210 that is operative to dispense both cash and digital content comprising sound recordings such as music and songs and/or video recordings such as movies and TV shows. However, it is to be understood that exemplary embodiments may also encompasses the dispensing of other types of digital information including digital representations of images, books, software, audiovisual works, cartoons, magazines, newspapers, games, compilations, databases and other types of digital content that may be delivered in a digital format.

Exemplary ATM 210 includes a display device 214 such as a CRT monitor or LCD display. The display device is operative responsive to the processor to output user interface indicia 246. The user interface indicia may include instructional outputs for operating the ATM as well as content indicia which are representative of the portions of digital information that may be dispensed from the ATM for a fee. In some embodiments the content indicia may include listings of songs, movies, books or other portions of the digital content which a user may select to have delivered. Exemplary embodiments may also include graphical representations regarding the information, such as pictures of the artist or CD liner in the case of music files. Audio and/or visual outputs may also be provided to identify, and in some cases enable the user to sample the available information.

Exemplary ATM 210 also includes at least one input device 216 such as a keypad, touch screen, and/or selection buttons. The input device(s) enable the user to enter operation inputs such as a personal information number (PIN) corresponding to an account, an amount of cash to withdraw, or a selection of a particular digital sound recording or other portion of the digital content to dispense. Although this described embodiment includes function keys, a touch screen and/or a keypad, alternative embodiments of the present invention may use other or additional types of input devices for entering information, such as a speech recognition system, or a track ball.

ATM 10 also includes a cash dispenser 224 and a card reader 220. The card reader 220 is operative to read indicia corresponding to account information from a user's card. The card may be a bank card, credit card, debit card, gas card, merchant card, smart card, or other medium that is operative to store account data and/or other information which may be used to identify a user or their accounts. In other embodiments the ATM may include a biometric type reading device which may identify the user by a characteristic thereof. Such biometric reading devices may include for example a fingerprint reader, iris scanner, retina scanner, voice recognition device, facial recognition reader or other device. The exemplary ATM 210 is operative to dispense a selected amount of cash to the user from the cash dispenser 224, and to debit the account of the user through communication with a financial transaction computer such as a host banking system. The exemplary ATM 210 is also operative to debit user fees from the account for dispensing digital information from the ATM as well.

In an exemplary embodiments, the ATM may also include at least one currency accepting device 222. For users who do not wish to use an account to pay for the dispense of digital information, the ATM is operative to receive the user fees in the form of cash such as bills and/or coin, using the currency accepting device 222.

In an exemplary embodiment, the digital information dispensed by the ATM 210 may includes digital sound recording files 244. Examples of digital sound recording files include MP3 files, AAC files, and WMA files. Typically each file corresponds to an individual music selection or song. However, sound files may correspond to any collection of sounds of any type and length. Other examples of sound recording files include compilations of songs such as are found on music CDs and spoken textual material corresponding to news articles, stories, speeches and books.

In an exemplary embodiment, the digital information dispensed by the ATM 210 may includes digital video files 245. Examples of digital video files include MPEG files, MPEG-4 files, DIVX files, WMV files, and Flash files. Typically each file corresponds to an individual audio-visual selection such as a movie, TV show and animation. However, video files may correspond to any collection of videos of any type and length. For example, video files may include compilations of TV shows or other audio-visual works.

In the exemplary embodiment, the ATM 210 acquires sound and/or video files to dispense from at least one remote digital information source 232. The source 232 may include a web site or FTP site on the Internet, or other servers in a public or private network. The exemplary ATM 210 is operative to periodically download a plurality of sound or video files that match certain customizable programmed criteria. The ATM may also download corresponding graphics associated with the sound and/or video files. These downloaded files are stored locally at the ATM in a local content data store 213 such as a hard drive. The ATM 210 is operative to display or output graphical, textual and/or audio content indicia representative of these sound and/or video files with the display device 214. A user of the ATM 210 may then provide one or more inputs to select and/or dispense one or more of these sound and/or video files.

The ATM may be programmably configured with different types of downloading criteria. For example, if the ATM is located in a dance club, the downloading criteria may be configured to have the ATM periodically download the sound and/or video files that correspond to the top one hundred most popular dance songs or music videos for the month. If the ATM is located in a book store, the ATM may be configured to periodically download sound files representative of the best-selling books and/or best selling movies for the month.

In the exemplary embodiment if the data store 213 does not have already stored therein the sound file or video file that a user desires, the exemplary ATM is further operative to have the user enter a selection input corresponding to the desired sound file or video file such as a title or the name of an artist or group. The ATM may then be operative to query one or more remote content data stores for the requested sound and/or video file(s). A message is returned to the ATM which is operative to cause the processor to generate a listing of matching sound and/or video files which is displayed on the display device 214 of the ATM 210. In a response to one or more dispense inputs from the customer, and for a fee, the ATM 210 is then operative to download and dispense one or more of the matching sound and/or video files from an output device.

In embodiments of the invention in which a network connection such as an Internet connection is not available or is not always used, the ATM may be operative to acquire sound files and/or video from portable storage mediums such as portable hard drives, flash memory device, CDs, DVDs. For example, sound files may be copied or ripped from the CD and saved locally to the data store 213 in the machine.

The exemplary ATM may be operative to dispense digital information in a plurality of different ways depending on the type of digital information. For example the ATM described in connection with FIG. 9 further includes an output device 218 that includes a sound system 260. The sound system 260 includes a sound signal amplifier 240 with a plurality of speakers 242. The ATM 210 is operative to output though the sound system 260, analog or digital signals that correspond to selected digital sound recording files. The signal amplifier 240 is operative to output sound through the speakers 242 that corresponds to the sound file signals. Such an ATM may then function as a fee-based digital music player or jukebox. For restaurants, bars, and other facilities that offer music, the exemplary embodiment of the present invention offers the ability to generate user fees for both the dispensing of cash and the dispensing of audible music.

For other forms of digital information that is visual, such as text, documents, images or video for example, the ATM may be operative to output such digital content either through the display device 214 of the ATM 210 or through an output device 218 that includes a video system 262 or a printing system 264. A video system may include one or more monitors, TVs, speakers, LCD displays, or projection TV. The embodiments of the present invention may include multiple output devices for outputting multiple forms of digital information concurrently. A printing system 264 may include a monochrome or color printer capable of outputting documents and/or photo quality prints of images or other graphics.

If multiple sound files or other forms of digital information have been selected for output through the output device, the exemplary embodiment may be operative to sequentially output each song either in the order the digital information was selected, or in other orders, including alphabetical by title of song, artist, album, style, or in a random order.

Alternative embodiments of the present invention may also dispense digital information such as sound files, to other storage mediums. For example the ATM 210 may include a storage device drive 226 such as a CD/DVD writer which is operative to accept a portable storage medium 236 such as a write-once or rewriteable CD/DVD. For a fee the ATM may be programmed to dispense the sound file by writing a copy of the sound file on a user supplied CD/DVD. Alternatively, the ATM may include a supply of blank CDs/DVDs or other media, and may copy the file onto the media and deliver it to the user. Examples of other types of storage device drives that are operative for use with embodiments of the present invention may include flash memory drives for writing to flash memory devices such as CompactFlash, SD cards and Sony Memory Stick®.

Alternative embodiments of the present invention may dispense digital information such as sound and video files, through an output device which includes a communication port 18 directly to a portable computing device. Examples of suitable communication ports 218 include a Universal Serial Bus (USB) port, a serial RS-232 port, parallel port, an infrared (IR) port, a radio frequency (RF) port such as Bluetooth, an IEEE-1394 port, a network port such as a wired or wireless Ethernet connection (e.g. IEEE 802.11a, 802.11b, 802.11g, and/or 802.11n), and/or any other type of port capable of outputting digital information to a portable wired and/or wireless device. When a portable computing device such as an Apple Video Ipod® is connected to the port 218, the ATM may be operative for a fee to download sound files and/or video files to the portable computing device. Examples of other types of portable computing devices that may receive dispensed digital information such as sound and/or video files include a portable computer such as a notebook computer, a personal digital assistant (PDA), a portable video player, and a mobile phone.

Alternative exemplary embodiments may be operative to dispense digital information to a user through the Internet by e-mail or FTP for example. In such embodiments the user may select the information through inputs to the ATM 210. The ATM would prompt the user to input through at least one input device an e-mail, FTP or other network delivery address. The ATM would then be operative through an output device such as a suitable network interface, to e-mail or FTP the selected digital information to the user, rather than dispensing the digital information through output devices, to a portable storage medium or to a computing device adjacent the ATM. Alternatively the ATM may send one or more messages through one or more networks to a remote computer, which messages cause the remote computer to send the selected digital content to the network address.

Figure 10:
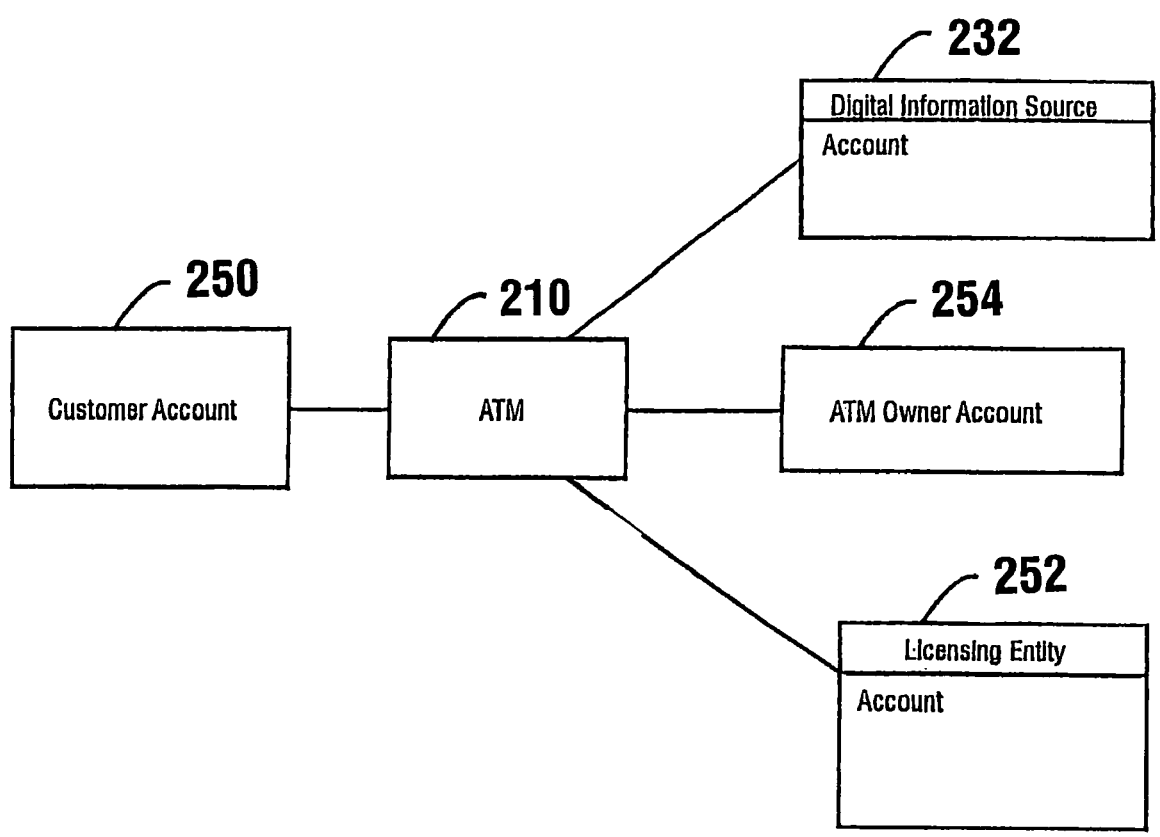
FIG. 10 is a schematic view representative of the distribution of transaction fees from digital information dispensed by an ATM.

FIG. 10 shows a schematic view representative of accounts that are accessed by the exemplary ATM 210 for distributing user fees. Because the ATM 210 is in operative connection with a host banking system, ATM 210 is enabled to deduct a user fee from an account of the user in exchange for the dispense of digital information. The exemplary embodiment of the ATM 210 operates by reading an account number from a card inserted by a user into the card reader 220. The account number includes data representative of the institution where the user's account is held. Examples of cards that are operative for use with some embodiments of the present invention include credit cards, bank cards, debit cards, merchant cards, smart cards, or any other portable medium that can store account or user information and/or data representative of stored value. The exemplary ATM 210 is operative to communicate with a financial transaction computer which includes or which can communicate with, a host banking system which can validate a user inputted PIN and authorize a transaction requested by the user at the ATM. If the PIN is valid and the transaction authorized, the message(s) sent by ATM 210 is further operative to cause the host banking system to debit user fees from the user's account corresponding to the requested dispense of cash and/or the requested dispense of digital information. Transaction fees or other charges for the convenience of using the machine may also be charged to the user's account. Alternatively as previously discussed, embodiments of the present invention may identify users by biometric information. The biometric data from the user may then be used by a local or remote computer to identify the user and/or their associated account information.

The dispensing of most digital information is limited by the copyright owner. Typically the copyright owner requires a fee or royalty to copy, display, publicly perform or otherwise deliver the work. The amount of the fee may vary depending on how the work is authorized to be used. For example if the work is a sound recording, the fee to play the sound file one time in a restaurant may be much less than the fee to dispense the sound file to a portable storage medium which may be duplicated an unlimited number of times. Consequently, an exemplary embodiment of the present invention is operative to track how digital information is dispensed and to transfer corresponding licensing fees to a licensing entity, a digital information source and/or other entities authorized to receive payment. Likewise stored information concerning the nature, location, size, contract status or other information concerning the establishment in which the particular ATM is located may be used to determine the fee. For example the fee to play a music file in a small restaurant may be less than in a large dance club. Similar principles may be applied to charging for other types of audio files, documents, images, videos, audio-visual files and pay-per-view type events.

The exemplary ATM 210 may be operative to debit a user fee from the user's account 250 for each dispense of digital information. The user fees may be transferred to a common banking account 254 of the operator of the ATM 210. Transfers of user fees may occur either immediately with each dispense and/or may occur periodically with the ATM 210 transferring data concerning multiple charges made to credit cards of various users to a financial transaction computer, such as a settlement host for example, which is operative to credit and debit accounts of the appropriate entities.

Licensing fees for downloading digital information from a digital information source may be transferred in a similar manner. The ATM 210 may generate messages or may include data in messages operative to cause a financial transaction computer to transfer a licensing fee from the account 254 that corresponds to the operator of the ATM 210, to an account of the digital information source 232. Such a transfer may be performed through the host banking system or through another transaction switch or through interaction of one or more financial transaction computers. Such transfers may occur with each download or may occur periodically for a batch of downloads which have occurred during a prior time period.

In an alternative embodiment, the ATM 210 is configured with inputs which include a terminal identifying UserID and a password for use when connecting through one or more networks to the digital information source 232. The UserID and password enable the ATM 210 to access the digital information source 232 and to download digital information. The digital information source 232 monitors all downloads that correspond to the UserID and periodically charges the account 254 that corresponds to the operator of the ATM. Alternatively for some types of digital information, the charge may be assessed against an account of the establishment where the ATM is located or an account of the operator of the establishment. This may be appropriate in cases where the use associated with the digital information, as indicated by the transaction messages received from the ATM and/or based on stored data, is a public display or performance of the work in the establishment. Of course other approaches may be used.

Once digital information has been downloaded to the data store 213 of the ATM 210, the copyright owner of the digital information may require that a licensing fee be paid with each dispense of the digital information to a user or upon each public display or performance. The ATM 210 or other connected computer is operative to keep records of each dispense of digital content and the character of dispense that is made. The exemplary ATM is further operative to transfer licensing fees associated with each dispense to an account of the digital information source 232 or another licensing entity 252 through the financial transaction computer. This transfer may be done with each dispense or periodically for a batch of dispenses.

In an alterative embodiment, the ATM 210 may be operative to transfer dispense records to the digital information source or the licensing entity through the Internet or other network. The digital information source 232 or licensing entity 252 may then debit or charge the licensing fees from an account that corresponds to the user, the operator of the ATM, the operator of the establishment or other appropriate entity.

For digital information that includes copy protection features or other technological measure to limit reproduction, access or use of the copyrighted work, the ATM 210 may be further operative to configure or incorporate the protection features and charge a user fee that corresponds to the copy or other protection features which are included. For example ATM 210 may be enabled to have the user select licensing features of a song file such as unlimited or restricted duplication, expiration dates, or other features of the sound file that affect the reproduction or use of the sound file. For example, the protection features used in some embodiments of the invention may restrict reproduction of the digital content so that it may only be played in the portable computing device to which it is initially delivered. Other features may restrict reproduction by preventing the digital content from being transferred from or otherwise reproduced in digital form from the media or device on which it is initially delivered. Other features may restrict reproduction by limiting the use of the digital content to a particular time period or to a particular number of plays. Of course additional or alternative approaches may be used depending on the system and the digital content involved. The ATM 210 may be operative to charge the user a corresponding user fee based on the type of protection features selected. The ATM may also be operative to cause the corresponding licensing or other fee to be paid to the source of the digital information or a licensing entity.

Alternative embodiments of the present invention may be used in connection with systems which include stored information concerning particular users. Such systems may be used to correlate the identity of the user with marketing or customer preference data. Such information may include particular categories of music, videos, books or other materials or products that can be provided and/or that are of interest to the particular user. The ATM may operate to automatically give the user options for selections tailored to their associated preference information. Alternatively such information may be used to automatically provide the user with digital files, visual or audio outputs or other outputs whenever the user operates an ATM connected to the system. For example when the ATM is operated as a jukebox, the ATM may operate to automatically display indicia corresponding to favorite artists or songs, or to output one or more of the user's favorite songs.

In certain embodiments of the invention it may not be desirable for a user to access their financial account each time a relatively small charge for digital information is assessed to the user. In such systems the system may be configured so that the user is required to make a "minimum purchase." This amount may be a charge reasonably sufficient to offset the costs of accessing the account, for example $10 or $20. This amount would then be credited to a content prepay account associated with the user. A prepay account record indicating a credit associated with the user or their account would then be stored in one or more data stores. This credit information may be stored locally on a smart card or other item, at the ATM or remotely in a computer such as a financial transaction computer which can be accessed from the ATM. For example in some embodiments the amount may be credited to a licensing or other organization. Alternatively, a financial transaction computer may debit the prepay account of the user as it is used and route payments to the appropriate entities. The amount of value associated with the prepay account may then be reduced each time the user receives a delivery of digital content until the account is exhausted. Such a system may be advantageously used where the fees involved in each digital file transaction are small, such as the cost or playing sound files. Such a system also provides the system operator, licensing entity, or other entity the benefit of the "float" on the allocated finds.

To discourage or limit the unauthorized reproduction of digital information that may be dispensed, exemplary embodiments of the present invention may be operatively programmed to modify features of the digital information before it is delivered for reproduction on a portable medium and computing device. For example portable computing devices may have Digital Rights Management Features (DRM) which limit copying and playing of the files. An exemplary embodiment is operative to communicate a purchased audio or digital file or other digital information file that includes DRM features which couple the file to the device and/or an account associated with the device. Such DRM features may include encryption of the file in a manner which enables only the device and/or authorized devices associated with a common account to play the file. Examples of video and audio files provided by the ATM which may include DRM features include AAC files, WMA, files, MP4 files, and WMV files.

In an exemplary embodiment, the processor in the ATM may embed or include a digital code, signature and/or certificate in/with the sound and/or video file that is reproduced on the user's portable digital sound player or other personal computing device. Such a certificate may further include an encrypted digital signature or other encrypted data that can be used to detect unauthorized alterations of the file and/or be used to enforce the digital rights management features associated with the file. Alternatively, the processor on the ATM may cryptography modify the sound and video data in the file to be coupled with an ID, code, or certificate associated with the portable computing device. The portable computing device would only be operative to play the sound and/or video file if the unique code, ID, or certificate associated with the portable sound and/or video player corresponds to encrypted information included in the sound/or video file.

Such features would limit playback of the file to the user's personal computing device. The sound and/or video file would be inoperative on another personal computing device that is associated with a different certificate, ID or code. Of course the same principles may be used with files that are downloaded to the ATM itself for storage in the local data store, when the files are only to be played through use of the ATM and not transferred to other devices.

In alternative embodiments the ATM may be operatively programmed to have the user register with a licensing entity for the digital content prior to dispensing digital content for the first time. During the registration process the user would be associated with a unique license code that may also be used when purchasing digital content in the future. The ATM may then be operative to encrypt the file in a manner that cryptographically associates the file with the license code for the user.

The license code may be manually input with the input device 216, read from a card with the card reader device 224, downloaded from the user's portable computing device 238, retrieved from another source and/or correlated with other data concerning the user. In an exemplary embodiment, the ATM may also be operative to validate the license code by communicating with the licensing entity. If the license code is valid and/or is in good standing, the ATM would be operative to dispense additional digital information coupled to the license code of the user. Such a unique license code may be generated by the licensing organization, or may correspond to the previously described digital code or certificate associated with the user's computing device.

These described methods of copy and/or use protection of the dispensed digital information may be further associated with a subscription service or club. For example during the previously described registration process the ATM may prompt the user to sign up for a digital information service that for a monthly fee enables the user to dispense a certain amount and/or type of digital information. For example the service may correspond to the dispensing of music files or digital book text files. Each month the user would be entitled to dispense a certain amount or an unlimited amount of these files from the ATM for a discount club rate fee or for no additional fee per dispense transaction.

When the user first signs up for the service, the ATM may be further operative to enable the user to associate payment of the service or club fees to an account of the user for automatic debit of the monthly club dues or dispense fees from the user's account. Such automatic payment information may be acquired by reading account information from a user's credit card or banking card with the card reader device 220 of the ATM.

For exemplary embodiments in which the ATM enables one more portable wireless devices to wirelessly interface with the ATM to purchases audio or video files (or perform other transactions), the devices may include software which is operative to authenticate that the ATM is a valid and trustworthy source of such content. For example, the portable wireless device may include a digital certificate of a certificate authority and/or a public key of certificate authority which is considered trustworthy. ATMs operative to wirelessly dispense digital information to portable wireless devices may include certificates signed by the trusted certificate authority. The portable wireless devices may be operative to undergo a handshaking operation (e.g. SSL, TLS, WAP) to authenticate the ATM and establish an encrypted communication channel before the device wirelessly sends financial account information or other private information to the ATM.

In a further exemplary embodiment, the ATM may serve as a wireless gateway to a remote music and/or video service. The portable wireless device may purchase (or otherwise select) digital content by interacting with the remote service through wireless communication with the ATM. The content which is made available to purchase or select by the service may be previously stored on the ATM. In response to a purchase/selection, the service may be operative to cause the ATM produce to a suitable DRM enabled file from the stored content, which DRM enabled file is wirelessly communicated from the ATM to the portable wireless device.

If the purchased/selected content has not been previously stored on the ATM, the service may be operative to send the purchased/selected content to the ATM. Depending on the size of the file, the service may transmit a message back through the ATM to the portable wireless device which conveys that the file is downloading to the ATM and to come back to the ATM after a certain time interval has passed to retrieve the file. The user of the portable wireless device may then leave the vicinity of the ATM and come back at a later time. When the portable wireless device reestablished a connection with the ATM, the ATM may be operative to automatically transmit the purchased/transmitted file to the portable wireless device without the need for the device to access the service. However, in other exemplary embodiments, the portable wireless device may access the service through the ATM prior to receiving the downloaded file from the ATM.

Computer software instructions used in operating the automated banking machines and connected computers may be loaded from computer readable media or articles of various types into the respective computers. Such computer software may be included on and loaded from one or more articles such as diskettes, compact disks, DVDs and other optical or magnetic media. Such software may also be included on articles such as hard disk drives, tapes, flash memory drives or other read-only or re-writable drives and storage devices. Other articles which include data representative of the instructions for operating computers in the manner described herein are suitable for use in achieving operation of automated banking machines and systems in accordance with exemplary embodiments.

The exemplary embodiments of the automated banking machines and systems described herein have been described with reference to particular software components and features. Other embodiments of the invention may include other or different software components which provide similar functionality.

Thus the new card activated cash dispensing automated banking machine and system of exemplary embodiments achieves at least one of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:
   a card activated cash dispensing automated banking machine, wherein the machine includes;
   at least one first computer processor;
   a card reader, wherein the card reader is operative to read card data from user cards, wherein the card data corresponds to financial accounts, and wherein the card reader includes the at least one first computer processor;
   at least one second computer processor;
   a cash dispenser, wherein the cash dispenser is selectively operative to dispense cash stored within the banking machine to machine users, and wherein the cash dispenser includes the at Least one second computer processor;
   wherein the at least one first computer processor and the at least one second computer processor, responsive at least in part to being placed in operative connection with the machine, operate to cause the card reader and the cash dispenser to deliver a respective device driver from each of them to at least one other computer processor in the machine, whereby the card reader and the cash dispenser each become interoperative with the machine, and cause the machine to be operative to carry out a first financial transaction wherein the first financial transaction includes operation of the card reader to read data from a first user card corresponding to a first financial account, operation of the cash dispenser to dispense cash from the machine wherein the dispensed cash has a first value, and operation of the machine to cause the first financial account to be assessed a first amount, wherein the first amount corresponds to the first value.

2. The apparatus according to claim 1, wherein the automated banking machine further includes:
   a wireless access device;
   wherein the wireless access device is operative to enable a portable wireless device to wirelessly communicate information to the machine, which information is operative to cause the machine to permit a further dispense of cash to a wireless device user through operation of the cash dispenser.

3. The apparatus according to claim 2, wherein the information wirelessly communicated from the portable wireless device to the wireless access device includes data corresponding to a second financial account.

4. The apparatus according to claim 3, wherein the cash dispensed in the further dispense of cash has a second value, and wherein the machine is operative to cause the second financial account to be assessed a second amount, wherein the second amount corresponds to the second value.

5. The apparatus according to claim 4, wherein the automated banking machine is operative responsive to being in operative connection with the portable wireless device through the wireless access device, to cause at least one processor in the machine to receive a device driver from the portable wireless device, wherein the machine is operative to use the device driver received from the portable wireless device to become interoperative with the portable wireless device.

6. The apparatus according to claim 5, wherein the automated banking machine is operative to deliver digital content through the wireless access device to the portable wireless device.

7. The apparatus according to claim 6, wherein the automated banking machine is operative to cause a charge to be assessed to the second financial account wherein the charge corresponds to the digital content delivered from the machine to the portable wireless device.

8. The apparatus according to claim 7, wherein the portable wireless device includes at least one of a mobile phone, a portable computer, a portable video player, and a PDA.

9. The apparatus according to claim 6, wherein the automated banking machine further includes:
   at least one third computer processor;
   a printer, wherein the printer is operative to print receipts corresponding to financial transactions conducted with the machine, and wherein the printer includes the at least one third computer processor;
   wherein the at least one third computer processor is operative to cause a respective device driver corresponding to the printer to be delivered from the printer to at least one other computer processor in the machine, whereby the printer becomes interoperative with the machine, and wherein the first financial transaction includes operating the printer to print a receipt corresponding to the first financial transaction.

10. The apparatus according to claim 9, wherein the automated banking machine further includes:
    at least one fourth computer processor;
    a keypad, wherein the keypad is operative to receive manual inputs from users operating the machine to carry out financial transactions, wherein the keypad includes the at least one fourth computer processor;
    and wherein the at least one fourth computer processor is operative to cause a respective device driver corresponding to the keypad to be delivered from the keypad to at least one other computer processor in the machine, whereby the keypad becomes interoperative with the machine, and wherein the first financial transaction includes operating the keypad to receive at least one manual input, wherein the first financial transaction is carried out responsive to the at least one manual input.

11. The apparatus according to claim 9 wherein the automated banking machine further includes:
    at least one central computer processor, and at least one central data store, wherein the at least one central computer processor is in operative connection with the at least one central data store;
    wherein the machine includes transaction function devices, wherein the transaction function devices include the card reader, the cash dispenser, the printer and the keypad, and wherein at least two of the transaction function devices are each operative to cause their respective device driver to be delivered to the at least one central computer processor, wherein the at least one central computer processor is operative to cause each of the device drivers to be stored in the at least one central data store;
    and wherein at least one first transaction function device of the automated banking machine is operative to access the device driver of a different transaction function device stored in the at least one central data store through communication with the at least one ventral computer processor, and wherein the at least one first transaction function device is operative to use the accessed device driver of the different device in operation to carry out the first financial transaction.

12. The apparatus according to claim 1, wherein the automated banking machine further includes:
    at least one third computer processor;
    a keypad, wherein the keypad is operative to receive manual inputs from users of the machine conducting financial transactions, wherein the keypad includes the at least one third computer processor;
    wherein the at least one third computer processor is operative to cause a respective device driver corresponding to the keypad to be delivered from the keypad to at least one other computer processor in the machine, whereby the keypad becomes interoperative with the machine, and wherein the first financial transaction includes operating the keypad to receive at least one manual input, wherein the first financial transaction is carried out responsive to the at least one manual input.

13. The apparatus according to claim 1, wherein the automated banking machine further includes:
    at least one third computer processor;
    a printer, wherein the printer is operative to print documents corresponding to financial transactions conducted with the machine, wherein the printer includes the at Least one third computer processor;
    wherein the at least one third computer processor is operative to cause a respective device driver corresponding to the printer to be delivered from the printer to at least one other computer processor in the machine, whereby the printer becomes interoperative with the machine, and wherein the first financial transaction includes operating the printer to print a receipt corresponding to the first financial transaction.

14. The apparatus according to claim 1 wherein the automated banking machine further includes:
- at least one central computer processor;
- at least one central data store, wherein the at least one central computer processor is in operative connection with the at least one central data store;
- and wherein the at least one first computer processor is operative to communicate a first device driver corresponding to the card reader to the at least one central computer processor, wherein the at least one central computer processor is operative to cause the first device driver to be stored in at least one central data store.

15. The apparatus according to claim 14 wherein the at least one second computer processor is operative to communicate a second device driver corresponding to the cash dispenser to the at least one central computer processor, wherein the at least one central computer processor is operative to cause the second device driver to be stored in the at least one central data store.

16. The apparatus according to claim 15 wherein at least one of:
- the at least one first computer processor is operative to access the second device driver in the at least one central data store through communication with the at least one central computer processor; and
- the at least one second computer processor is operative to access the first device driver in the at least one central data store through communication with the at least one central computer processor.

17. Apparatus comprising:
- an automated banking machine operative to carry out financial transfers, including:
- a card reader, wherein the card reader is operative to read card data from user cards, wherein the card data corresponds to financial accounts, and wherein the card reader includes a first computer processor;
- and wherein the machine includes at least one further transaction function device, wherein the at least one further transaction function device includes at least one of:
- a cash dispenser, wherein the cash dispenser is operative to cause cash stored in the machine to be made available to users outside the machine;
- a keypad, wherein the keypad is operative to receive user inputs to the machine; and
- a printer, wherein the printer is operative to print financial transaction receipts;
- wherein the at least one further transaction function device includes a second computer processor;

and wherein the first computer processor and the second computer processor, responsive at least in part to being placed in operative connection with the automated banking machine are operative to cause the card reader and the at least one further transaction function device to deliver a respective device driver from each of them to at least one other computer processor in the machine, whereby the card reader and the at least one further transaction function device become interoperative with the machine, and cause the machine to be operative to carry out a financial transaction including operation of the card reader to read first card data from a first card corresponding to a first financial account, and operation of the machine to cause a first financial transfer, wherein the first financial transfer includes transferring funds at least one of to and from the first financial account.

18. The apparatus according to claim 17 wherein the automated banking machine includes a plurality of transaction function devices, wherein the plurality of transaction function devices include each of the cash dispenser, the keypad and the printer, and wherein each transaction function device includes a respective second computer processor, and wherein each respective transaction function device operates to deliver a respective device driver corresponding to the respective transaction function device to at least one other computer processor in the machine, wherein the plurality of transaction function devices intemperate to cause the machine to carry out the financial transaction.

19. The apparatus according to claim 18 wherein the automated banking machine further includes:
- a central computer processor within the machine, and a central data store within the machine, wherein the central data store is in operative connection with the central computer processor;
- and wherein each of the card reader, the cash dispenser, the keypad and the printer is operative to cause a respective device driver to be communicated to the central computer processors and wherein the central computer processor is operative to cause each respective device driver to be stored in the central data store;
- and wherein each respective device driver of the card reader, cash dispenser, keypad and printer in the central data store is accessed by at least one computer processor of the machine to cause the machine to carry out the financial transaction.

20. The apparatus according to claim 18 wherein the automated banking machine further includes a wireless access device, wherein the wireless access device is operative to cause the automated banking machine to interoperate with a portable wireless device.

* * * * *